United States Patent [19]
Weggeland

[11] 3,797,144
[45] Mar. 19, 1974

[54] DISPLAY-TYPE PICTURE VIEWER

[75] Inventor: John H. Weggeland, Lehigh Acres, Fla.

[73] Assignee: WML Incorporated, Santa Ana, Calif.

[22] Filed: Sept. 7, 1972

[21] Appl. No.: 287,102

[52] U.S. Cl.......................... 40/36, 40/65, 40/78.07
[51] Int. Cl............................................. G09f 11/30
[58] Field of Search ...... 40/36, 78.03, 78.07, 78.09, 40/64, 65

[56] References Cited
UNITED STATES PATENTS

| 1,224,232 | 5/1917 | Sumner | 40/78.09 |
| 1,920,084 | 7/1933 | Kauffman | 40/36 |
| 3,485,558 | 12/1969 | Michniewicz | 40/79 X |
| 3,377,727 | 4/1968 | Weggeland | 40/78.07 |
| 3,495,345 | 2/1970 | Weggeland | 40/63 A |

Primary Examiner—Wm. H. Grieb
Assistant Examiner—L. R. Oremland
Attorney, Agent, or Firm—Hyman Jackman

[57] ABSTRACT

A display-type viewer particularly adapted for use in commercial areas, such as retail shops, marts, and other populous areas, and in elevated, easily viewable locations, the same including continuously operable means for successively shifting the front picture or sign of a vertical pack of such item and successively and continuously exposing them to the view of the people in the locale.

7 Claims, 7 Drawing Figures

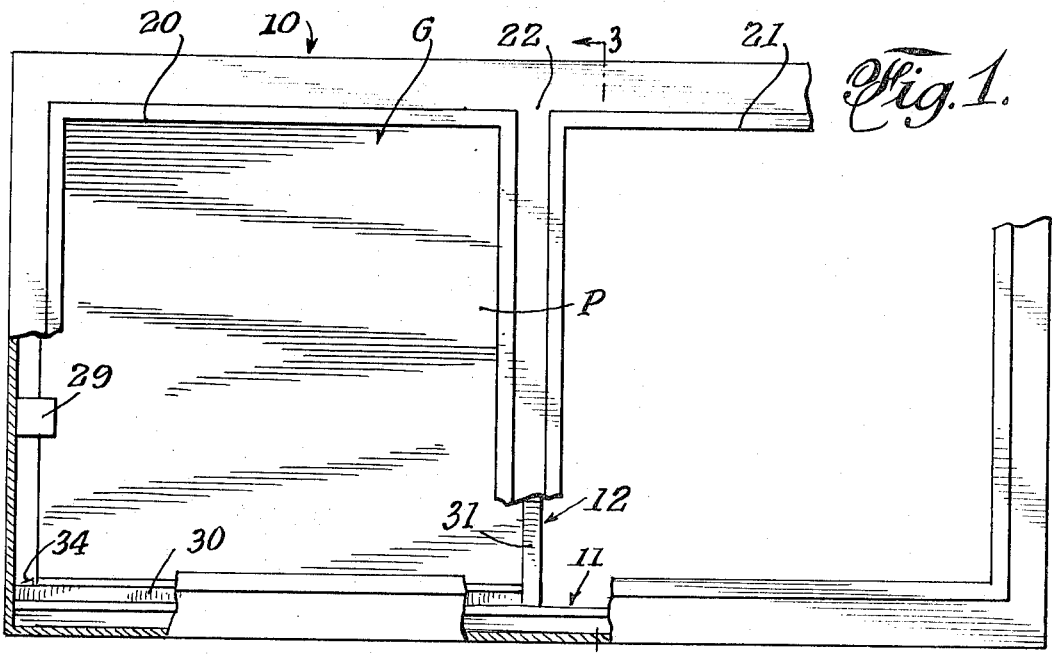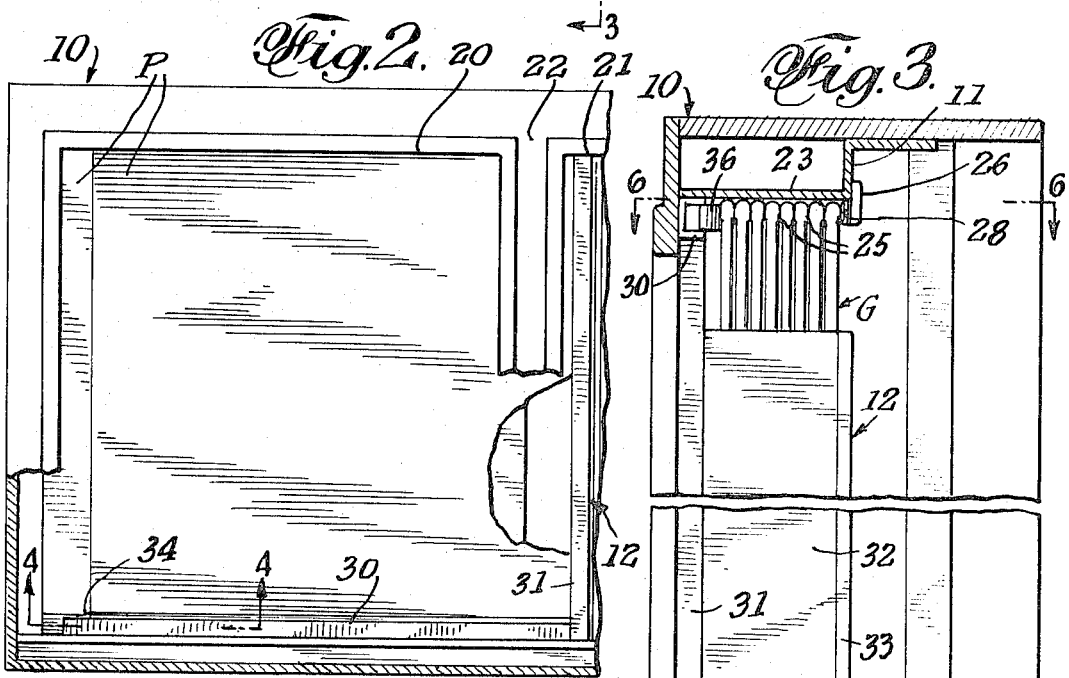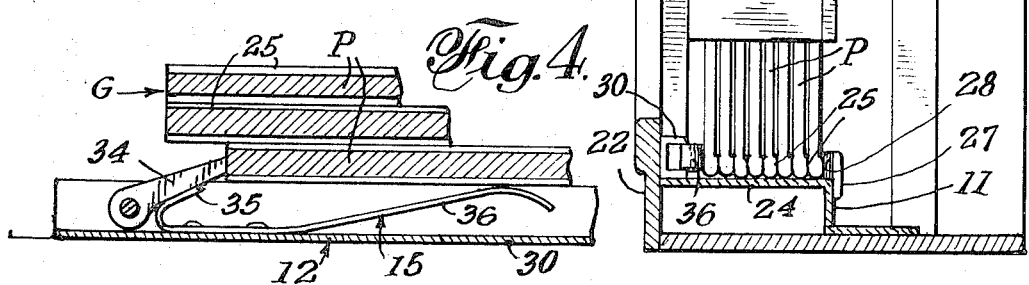

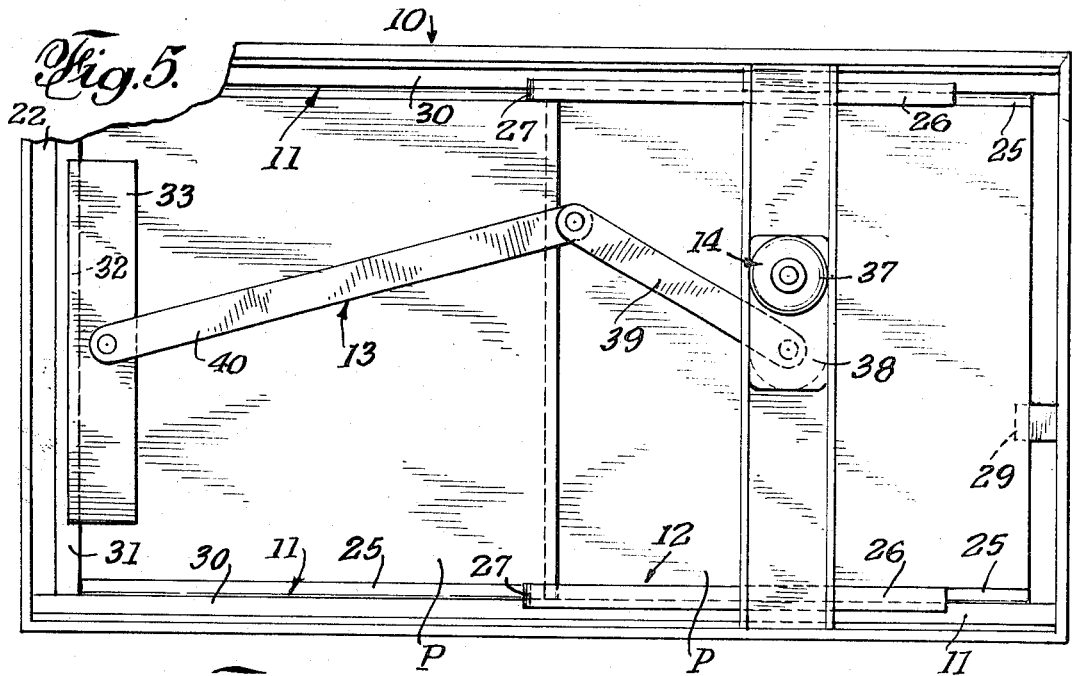
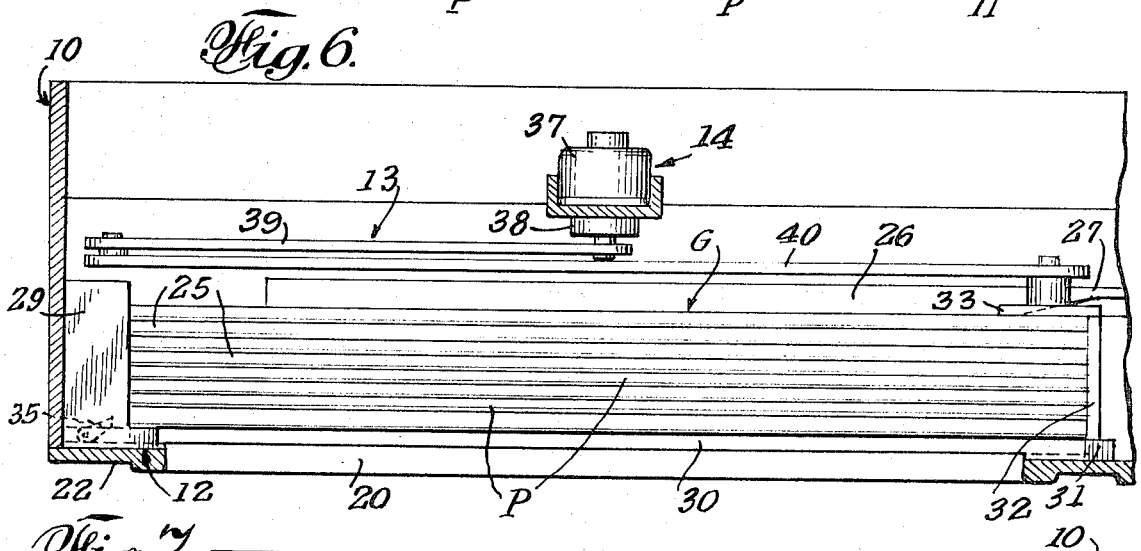
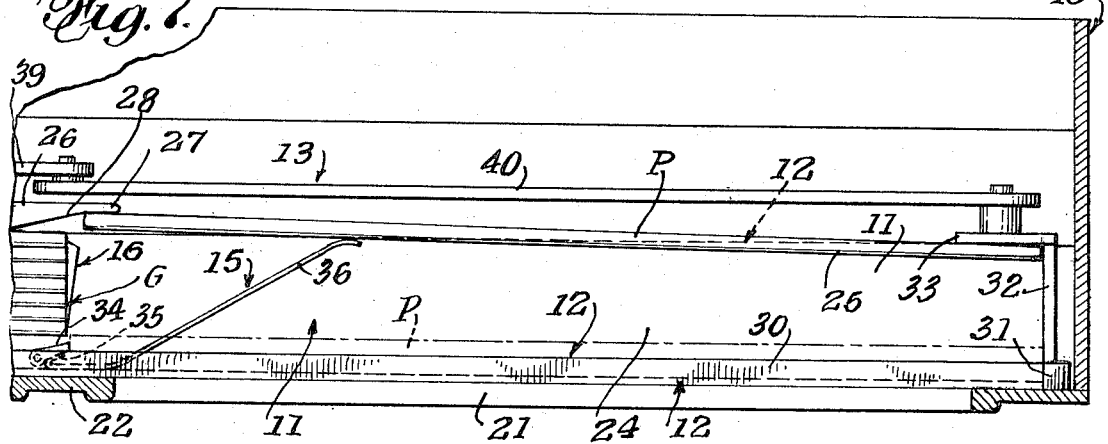

DISPLAY-TYPE PICTURE VIEWER

BACKGROUND OF THE INVENTION

1. Field of the Invention

Eye-attracting displays that, due to their mobility of the pictures and signs displayed intensify and retain the interest in their viewers.

2. Description of the Prior Art

Shuttle-type picture viewer feeding pictures from a pack thereof are well known and are usually of the type that move snap shots to and from an illuminated area beneath an enlarging lens. An example of such a device is disclosed in U.S. Pat. applicant's Pat. Nos. 3,495,345, and 3,377,727.

SUMMARY OF THE INVENTION

A rectangular housing of a length twice its height and having side-by-side framed openings, a vertically arranged group of flat, substantially rigid poster-like pictures or signs disposed vertically behind one of said openings so the front picture or sign is exposed, and power means that operates a shuttle which successively shifts the front pictures of the group to be exposed through the other of said openings and thereby exposing the next picture of said pack during movement of the shuttle in one direction, and successively returns the shifted picture to a position behind the group of pictures during reverse movement of the shuttle.

An object of the present invention is to provide an attention-attracting display-type picture viewer, as above generally characterized, that is substantially in continuous action and yet having the pictures thereof immobile for periods of time that enable visual contemplation.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawings. However, said drawing merely shows, and the following specification merely describes one embodiment of the present invention, which is given by way of illustration or example only.

BRIEF DESCRIPTION OF THE DRAWINGS

FIG. 1 is a front elevational view, partly in section and partly broken of a display-type picture viewer according to the present invention.

FIG. 2 is a similar view showing the front picture of the group thereof being displayed by the viewer, in another position.

FIG. 3 is a broken and enlarged vertical sectional view as taken on the line 3—3 of FIG. 1.

FIG. 4 is an enlarged and detailed cross-sectional view as taken on the line 4—4 of FIG. 2.

FIG. 5 is a partly broken rear elevational view with said initially front picture in position preparatory to be returned to the rear of the group of pictures.

FIG. 6 is a cross-sectional view as taken on the line 6—6 of FIG. 3, the view showing the left hand portion of the viewer.

FIG. 7 is a similar cross-sectional view showing the right hand portion of the viewer in the position thereof preparatory to returning the front picture to the rear of the group of pictures.

DESCRIPTION OF THE PREFERRED EMBODIMENT

In this specification and in the appended claims, the term "picture" is intended to include signs, placards, boards, etc. bearing some information or advertisement and which may or may not include pictures or other illustrations.

The picture-viewer that is illustrated comprises, generally, a rectangular housing 10 approximately twice as long in one dimension as in the other; upper and lower guide means 11 providing a runway between which pictures P are retained as a group or pack G and between which the same are successively guided when moved first from the front of the Group G, and then back to the rear of said group; a picture-moving shuttle 12 disposed between the upper and lower guide means 11 and reciprocatively movable between a position in register with the picture group G and engaged with the upper and lower edge portions of the front picture P of the group G thereof, and a position offset from said picture group; means 13 for reciprocating the shuttle; a drive 14 for said means 13; means 15 imposing a bias on the outer face of the picture being moved by the shuttle; and means 16 to engage the picture adjacent the trailing edge of th picture being moved by the shuttle to prevent a too rapid and noise-producing deflection of the latter picture when moved by the biasing means.

The housing 10 is shown as having aligned, preferably rectangular openings 20 and 21 formed in the front wall 22 thereof, perimeter-enclosing top, bottom and sidewalls forming a casing of which the wall 22 is the front. The housing walls may be wooden or any other suitable material. While shown open, the rear of the housing may be closed by a suitable removable panel.

The guide means 11 is shown as an upper, preferably metallic rail having a wall 23, and a similar lower rail having a wall 24, parallel to the wall 23, said walls being disposed in aligned opposed relation to constitute a runway that extends from side to side of the housing as above indicated. The mentioned pictures P are formed of a height that enable their sliding movement upon the lower wall 24 with but slight clearance in relation to the wall 23.

The pictures may be ordinarily made of cardboard or other lightweight non-metallic material. In such case the upper and lower edges thereof may be provided with metal bindings 25 to minimize wear and lower smoother sliding movement of the picture P on the runway wall 24.

On the rearward side of each of the guide means 11 is provided a retainer bar 26 which locates the group G of pictures, as best seen in FIGS. 3 and 6. Extending beyond the picture group, said bars are each provided with an end 27 that is bevelled as at 28, so that a picture may be guided thereby from the position laterally of the picture group to a position behind said group.

It will be noted that the picture group, as seen in FIG. 6 is behind the housing opening 20, the same being centered in relation to said opening by a block 29. It is from this position that the shuttle 12 first shifts the front picture of said group to a position centered behind the opening 21, as in FIG. 7, and, finally, from the latter position to a position behind the picture group to restore the moved picture to the group of pictures.

Said shuttle 12 is shown as comprising horizontal upper and lower channels 30 that are located inside of and in sliding engagement with the inner faces of the front wall 22 of the housing. The lower channel 30 also has sliding engagement with the wall 24 of the lower rail, the upper channel 30 having sliding or slight clearance relationship to the wall 23 of the upper guide member 11. The ends of said channels that are directed to the right, as in FIG. 1, are connected by an upright member 31, said channels 30 and member 31 forming a U-shaped frame which rests upon the lower channel 30. A plate 32 extends rearwardly from the upright member 31 and mounts a strip 33 on its rearward edge, as best seen in FIGS. 6 and 7.

On the end of each channel 30 beyond the picture pack is provided a pivoted dog 34 that is biased by a spring 35 in a rearward direction to have engagement with the trailing edge of the front picture P of the pack G when the shuttle is moved from its position engaged with said picture pack, as in FIG. 6, toward the right, as in FIG. 7, clear of the right end of said picture group, and in framed register with the opening 21 of the housing. It will be clear that, except for the portion of the housing wall 22 between the openings 20 and 21, the picture being thus moved by the shuttle is visible to the observer and that the next picture of the group becomes exposed to view through the opening 20.

As seen in FIGS. 3, 4, and 7, each of the channels 30, adjacent to the ends thereof mounting the dogs 34, is provided with the mentioned means 16, shown as elongated leaf springs 36 that press rearwardly against the upper and lower edges or metal bindings 25 of the front picture before and during the latter's movement to the right, as above described. While the picture being moved is yet in contact with the picture therebehind, the springs 36 are flattened, as in FIG. 4. When the trailing edge of the picture being moved reaches the dot-dash line position of FIG. 7, said edge will be released by the picture group so that the bias of springs 15 move the picture in the latter position to a position with its leading edge engaged with the strip 31 and its trailing edge engaged with the bevelled ends 27 of the bars 26.

A too sudden release of the trailing edge of the picture may cause a noisy operation. The means 16 is shown as a member with a sloping face or portion that serves as a movement-retarding means as the springs 36 press the released picture to its full-line position of FIG. 7.

On the return movement of the shuttle, the picture carried thereby will slide into position behind the picture group being guided by the mentioned bevel ends 28 of the bars 26.

Any suitable driving means for the shuttle may serve, providing the same has the below-described characteristics, the means 14 shown comprises a motor 37 that operates a reducing gear 38 which, by means of a crank arm 39 rotated by said reducing gears, reciprocates a link 40 that is connected to the strip 33. Said arm and link comprise the shuttle-reciprocating means above generally referred to.

It will be noted that while the arm 39 of the drive 14 rotates at a constant speed, the end of the link 40 that is connected to shuttle strip 33 moves the shuttle slower at the start of its movement from the position of FIG. 6, and at the end of its movement to the position of FIG. 7. As a consequence, both pictures exposed during one reciprocation of the shuttle are at rest or substantially so for a longer period of time than when the crank arm 39 is moving through the high and low points of its arc, when it is shifting a picture during its more rapid traverse. Thus, the moving time afforded the two pictures during the cycle of movement above described occupies the major portion, timewise, of the cycle.

While the foregoing has illustrated and described what is not contemplated to be the best mode of carrying out the invention, the construction is, of course, subject to modification without departing from the spirit and scope of the invention.

Having thus described the invention, what is claimed and desired to be secured by Letters Patent is:

1. A display-type picture viewer comprising:
   a rectangular housing having a front wall provided with two side-by-side openings,
   upper and lower longitudinal guides in the housing above and below said openings for locating a pack of pictures therebetween in framed register with one of said openings,
   a shuttle guided between said guides for reciprocative longitudinal movement, said shuttle having horizontal members between the front wall of the housing and the front picture of the pack,
   vertically spaced means carried by said shuttle members and located to have engagement with the edge of the front picture of the pack that is farthest from the other of said openings in the housing,
   resilient means carried by the horizontal shuttle members to rearwardly press against said front picture during its movement with the shuttle to a position framed behind said other housing opening with the first-mentioned edge thereof clear of the stack of pictures, said pictures, thereby being resiliently moved to a position rearward of the rear of the stack, and
   means on the shuttle to engage said picture to move the same to a position behind the rear of the stack upon reverse movement of the shuttle to its initial position.

2. A display-type device according to claim 1 in which the vertically spaced means comprises dogs that are depressed by the picture of the pack that was exposed upon removal of the front picture and, thereby, permitting the shuttle to complete its return movement preparatory to moving said exposed picture from its position in register with first mentioned housing opening to a position in register with the other housing opening.

3. A display-type device according to claim 1 in which the means to resiliently press the picture in a rearward direction comprises an elongated spring member, each said spring member being directed toward the leading portion of the shuttle remote therefrom to, thereby, engage and press against portions of the picture being moved that are adjacent to the picture moving means.

4. A display-type device according to claim 3 provided with guide means engaged with the forward edge of the picture pack and having a face in the path of movement of the trailing edge picture being pressed by the resilient means rearwardly to slow such movement and, thereby, lessen the noise of a too rapid deflection rearwardly of the picture of the spring means.

5. A display-type device according to claim 1 in which the pack of pictures is retained in position by a retainer bar at the rear of the pack, said bar, at the end thereof that engages the picture that had been moved from in front of the pack, being provided with a bevel to guide the picture during its return to the pack, to a position between said bar and said pack.

6. A display-type device according to claim 5 in which the shuttle is provided with a portion at the leading end thereof to engage the leading portion of the picture, the same being longitudinally aligned with the retainer bar.

7. A display-type device according to claim 1 in which the reciprocative movement of the shuttle comprises a constantly driven means which moves the shuttle slower at the beginning and the end of its movement than during the remaining portion thereof, thereby exposing the pictures, as seen through said housing openings, for a time period longer than in the in between movement of the pictures.

* * * * *